United States Patent

Noakes et al.

[15] 3,696,611
[45] Oct. 10, 1972

[54] THERMAL MOTORS

[72] Inventors: Thomas E. Noakes, Detroit, Mich.; Thomas P. Konen, Somerville; Albert Kokalari, South Plainfield, both of N.J.; Robert B. Duggan, East Aurora, N.Y.

[73] Assignee: Scovill Manufacturing Company, Waterbury, Conn.

[22] Filed: Sept. 17, 1969

[21] Appl. No.: 858,595

[52] U.S. Cl. .......................60/23, 337/107, 338/22
[51] Int. Cl. ........F03g 7/00, H01h 71/16, H01c 7/04
[58] Field of Search ..............60/23; 323/68; 338/22; 337/107; 73/363; 252/520

[56] References Cited

UNITED STATES PATENTS

| | | |
|---|---|---|
| 3,500,634 | 3/1970 | Waseleski et al. .............60/23 |
| 3,263,411 | 8/1966 | Carlson et al. ................60/23 |
| 3,434,089 | 3/1969 | Waseleski et al. .........337/107 |
| 3,375,774 | 4/1968 | Fujimura et al. ............338/22 |
| 3,400,252 | 9/1968 | Hayakawa et al. ........219/505 |
| 3,243,753 | 3/1966 | Kohler.......................219/505 |
| 2,534,497 | 6/1947 | Albright..................60/23 UX |
| 2,977,558 | 6/1958 | Hampton....................338/22 |
| 3,219,480 | 6/1961 | Girard.........................338/22 |
| 3,412,359 | 12/1966 | Schwyn et al...............338/22 |

Primary Examiner—Martin P. Schwadron
Assistant Examiner—A. M. Zupcio
Attorney—Dallett Hoopes

[57] ABSTRACT

An electrical-to-thermal-to-mechanical power translating device comprising a mass of solid-to-liquid expansion material packed into a piston-cylinder chamber and heated electrically by a positive temperature coefficient thermistor for developing piston movement. The thermistor is a current limiting device which automatically controls the length of the piston stroke by self-regulating the upper operating temperature level.

11 Claims, 5 Drawing Figures

PATENTED OCT 10 1972

INVENTORS
Thomas E. Noakes, Thomas P. Konen,
Albert Kokalari and Robert
B. Duggan.
BY John B. Sotak

THERMAL MOTORS

The present invention relates to an electrical-to-thermal-to mechanical translating device, and more particularly to a thermal motor comprising a piston-cylinder compartment containing a thermal responsive expandable material which is heated by a positive temperature coefficient thermistor.

While various types of heat translating devices have been previously proposed for converting thermal energy into mechanical movement, each of these earlier thermal devices is possessed of certain shortcomings which either reduce the overall efficiency and reliability or limit the environment in which the devices may be used. Many expansion and contraction types of thermal devices include a piston-cylinder compartment and electrical heating element in thermal relationship thereto. The piston-cylinder compartment contains a heat responsive material, such as, solid-to-liquid wax which expands with increasing temperatures and contracts with decreasing temperatures. The expansion and contraction of the wax material imparts longitudinal movement to the piston which may be utilized for various control functions, such as, opening and closing a fluidic valve or an electrical switch or operating an associated mechanical device. In these prior art arrangements, the electrical heating element normally consisted of a controllable resistive heater, such as, a wire wound coil which transforms electrical energy into thermal energy, thereby providing the necessary heat for liquefying the expandable wax. The amount of heat generated by the heater coil was usually regulated by means of a switch or electrical contacts which cyclically interrupt the supply of power to the heater coil. Further, it was common practice to employ and utilize motion of the piston to recurrently open and close the switch contacts. That is, the switch contacts were normally disposed at or near the point at which the piston is fully extended. The switch is normally closed and is arranged to become opened by the piston when it nears or reaches its fully extended position. Thus, with the switch opened the supply of electrical power to the coil is interrupted and no further heat is applied to the wax material. Accordingly, the wax material ceases to expand and no further movement is imparted to the piston. Now the wax material begins to cool and contract so that the piston starts to retract or move to its retracted position. When the piston moves or becomes retracted a given amount, the switch contacts again close and electrical power is once more connected to the heating coil. The recycling operation of the switch contacts continues and the piston will remain substantially fully extended until some positive action is initiated, such as, opening a main switch in the power supply circuit. It will be appreciated that while these prior art heat translating devices or thermal motors have functioned with some degree of satisfaction in the past, the cyclical switching operation is highly undesirable and very often troublesome. First, the switch contacts are susceptible to both mechanical and electrical wear and fatigue which shortens the overall life, reliability and efficiency of the thermal motor. Second, the repeated interruption of the switch contacts produces radio and television interference which is irritating and unpleasant to listeners and viewers. Third, the necessity and addition of an electric switch increases not only the initial manufacturing cost but also the subsequent maintenance cost of the thermal motor. Fourth, the electric arcing of the switch contacts not only errodes the contact surfaces but also limits the use of the thermal motor to nonvolatile environments unless some type of protective case or housing is effectively used for isolating the contact arcing. The addition of a protective case is objectionable in that increased cost as well as enlargement of thermal motor occurs. Further, there always remains the possibility of a leak developing in the case or housing so that the afforded protection is destroyed.

Accordingly, it is an object of the present invention to provide an improved thermal translating device which alleviates the above-mentioned problems and disadvantages.

A further object of the present invention is to provide an expansion-contraction type of thermal motor having a switchless type of positive temperature coefficient element for heat regulating the thermal motor.

Another object of the present invention is to provide an expansion-contraction type of thermal motor having a current-limiting element for heating the thermal motor.

Yet a further object of the present invention is to provide a thermal motor having a piston-cylinder compartment containing a heat responsive material and a heating element having a self-regulating, current-limiting characteristic for heating the heat responsive material thereby causing the piston to extend a predetermined amount.

Yet another object of the present invention is to provide a positive temperature coefficient heater element for heating solid-to-liquid material of an expansion and contraction type of thermal motor.

Still a further object of the present invention is to provide a heat motor with thermistor for self-regulating the amount of thermal energy applied thereto.

Still another object of the present invention is to provide a novel thermal motor which is unaffected by corrosion, dirt or volatile atmospheres, which does not adversely affect radio and television reception, and which requires no regulatory adjustments in the field.

Still yet another object of the present invention is to provide a new and improved heat motor which is economical in coast, simple in construction, reliable in operation, durable in use and efficient in service.

The above objectives of the invention are achieved by employing a power device having a container which includes at least two relatively movable members cooperatively defining a variable-volume chamber. A mass of temperature-sensitive material is arranged to occupy the chamber. The material undergoes thermal expansion when heated through a given operating temperature range and undergoes thermal contraction when cooled through the given operating temperature range. The thermal expansion and contraction of the material displaces the two relatively movable members. The particular type of material selected has an operating range which is at least 100° F. above the normal ambient so that thermal energy may be effectively dissipated to the ambient during the cooling cycle. The power device includes a positive temperature coefficient thermistor which is arranged in heat transfer relation with the material. A heat retaining shield is disposed in cooperative association with the thermistor to improve the heat transfer characteristics by reducing the amount of thermal energy which is lost to the ambient. The thermistor experiences an appreciable increase in resistance as the temperature rises and passes the lower level of the operating temperature range. Thus, the thermistor causes an inherent current-limiting action to occur throughout the operating temperature range, and upon reaching the upper level of the operating temperature range a self-regulating effect takes place so that no further displacement occurs between two movable members.

In a first embodiment, the container includes a cup element so that the temperature-sensitive material is located within the cup element and the thermistor is in the form of a hollow sleeve which substantially surrounds the cup element.

In a second embodiment, the container includes a cup element having a recess in addition to the chamber so that the temperature-sensitive material is located within the chamber and the thermistor is located within the recess.

In a third embodiment, the container includes a cup element so that the temperature-sensitive material is located within the cup element and the thermistor is in the form of a disc member which is attached to the outside of the cup element.

The present invention will be better understood after a consideration of the following detailed description and with reference to the accompanying drawings wherein.

Figures 1, 2, 3:
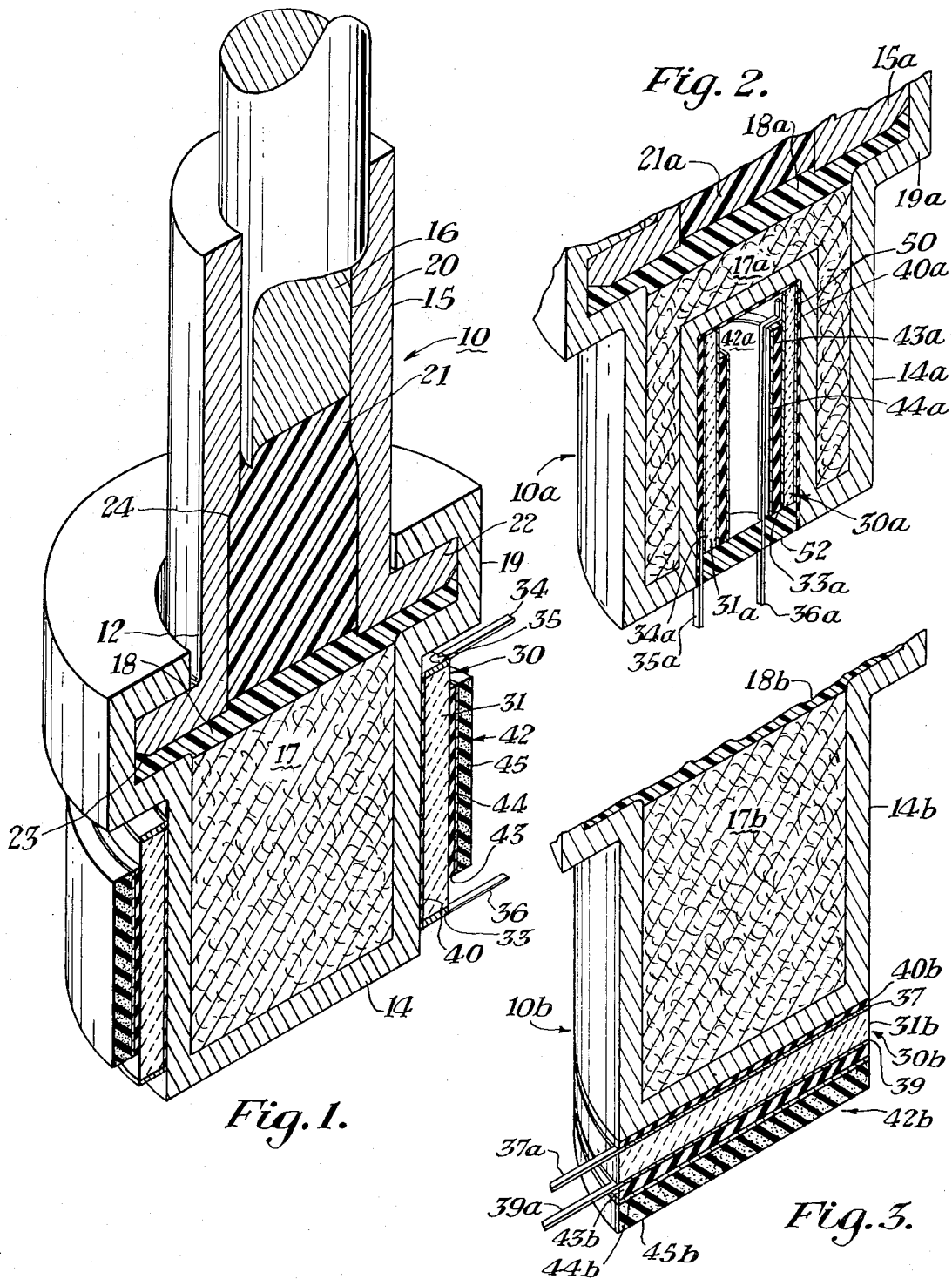
FIG. 1 is a partial vertical cross sectional view taken through a thermal device incorporating the inventive concept of the present invention.
FIG. 2 shows a partial perspective vertical sectional view of a first modified version of a thermal device incorporating the teachings of the present invention.
FIG. 3 shows a partial perspective vertical sectional view of a second modified version of a thermal device encompassing the teachings of the present invention.

Referring now to the drawings and in particular FIG. 1, there is shown a power translating device or thermal motor generally characterized by numeral 10. The thermal motor 10 includes an exterior tubular casing or container 12 which is preferably constructed of two metallic members, namely, a lower cup-shaped element 14 and an upper cylindrical cap 15. A mechanically movable member in the form of a cylindrical piston 16 is disposed within and is shown having one end slightly extending from the upper end of the cylinder 15. As will be described in greater detail hereinafter, the piston 16 is adapted to slidably move within cylinder 15 between a first contracted and a second extended position. It will be appreciated that the mechanical movement or motion of the piston 16 may be harnessed to actuate a valve, to operate a switch or to control various other devices, such as, automobile thermostats, aircraft temperature control valves or water mixing valves, etc.

As shown, positioned or packed into lower cup-like member 14 is an initially solid pellet 17 formed of heat responsive wax or other similar fusible temperature-sensitive material. When employing an expandable wax, it has been found advantageous to provide a conductive fuller material, such as, finely divided copper powder, which is dispersed evenly throughout the wax for improving its heat conduction and absorption qualities. At low temperatures approximately below 200° F., the wax is solid, while at higher temperatures approximately above 230° F., the wax becomes liquefied. During its solid-liquid transition, the wax undergoes an appreciable thermal expansion which can be utilized to produce relative motion between movable piston 16 and stationary casing 12, as will be described presently.

An elastomeric diaphragm or disk 18 is positioned adjacent the upper surface of the wax 17 and is adapted to fit snugly within the inner wall of the flange 19 of the cup-like member 14. Internal of the lower bore portion 20 of the cylinder 15 is a force-transmitting flowable elastomeric plug 21 which communicates with the upper surface of diaphragm 18 and the lower end of piston 16. The cup-like member 14 and cylinder 15 are securely fastened together by crimping the peripheral edge of the flange 19. The crimping action forces the annular flange 22 of cylinder 15 to compress the peripheral edge of the diaphragm 18 against the flange 19 so that the expansion material is effectively sealed with the cup 14. As shown, the lower peripheral edge of the flange 22 is preferably removed so that an annular bead 23 is formed on the outer periphery of the diaphragm 18. Thus, the diaphragm 18 is rigidly held between the flanges 19 and 22, respectively. Accordingly, the wax pellet 17, the diaphragm 18, and the plug 21 occupy the compartment or chamber which is formed by two members 14 and 15.

As previously mentioned, the opened end of the cylinder 15 is fitted with the piston 16. It will be appreciated that as the wax 17 expands, it will force the central portion of the diaphragm 18 to deform upwardly into the bore 20 of cylinder 15. This will cause the plug 21 to move bodily upward thereby advancing the piston 16 outwardly. The internal bore of the cylinder 15 is shown as reduced at 24 to a smaller diameter. This reduction in bore size has the advantage of supplementing the elongation of the plug 21 during its bodily movement, thereby multiplying the piston motion. It will be understood that when the wax 17 is allowed to cool, a biasing means, such as, an external spring (not shown) returns the piston 16 to its initial retracted position, as shown in FIG. 1.

In accordance with the present invention, the application of thermal energy or heat to the wax 17 is accomplished by means of a positive temperature coefficient thermistor 30. In the present instance, the thermistor 30 is generally shown as a hollow cylinder or sleeve-like semiconductive member 31. As shown, the semiconductive sleeve 31 has an inner diameter slightly greater than the outer diameter of the lower cup member 14. The thermistor heater 30 is provided with a pair of electrodes 33 and 35 which are suitably attached by depositing or soldering to the two ends of the semiconductive cylinder 31. As shown, a conductor or lead 34 is attached, such as by soldering, to the upper electrode 35 while the conductor or lead 36 is attached to the lower electrode 33. The other end of each of the conductive leads 34 and 36 is preferably connected to a suitable controllable power supply which preferably includes a voltage source and an electrical switch. A layer 40 of thermal conductive and electrical insulative material, such as thermal grease, epoxy resin or any other suitable heat transfer cement is interposed between the sleeve 31 and cup 14. The exterior surface of the semiconductive sleeve 31 is covered by a heat shield 42. The heat shield 42 may include an inner insulative layer 43, an intermediate sheet of aluminum foil 44 and an outer foam layer 45 or may simply include a layer of foam rubber. Thus, in either case, the heat generated by the thermistor 30 is less likely to be dissipated to ambient and is more effectively forced into the thermal expandable wax 17.

The coefficient of temperature expansion for the thermistor material 31 is usually less than for the cup member 14 (which is most often constructed of copper or the like). Thus, in order to preclude fracture of the semiconductive sleeve 31, an axial slit or gap (not shown) is provided at a convenient location in its circumference. Further, it will be appreciated that the thermistor 30 could be fabricated from two pieces each in the form of C-shaped cross section instead of a tube-like member. In cases where the difference in thermal expansion is not excessive, the heat transfer cement 40 will aid in protecting the sleeve 31 from being fractured. In such case, the semiconductive sleeve could be a fully closed tube. It will be appreciated that the thermal performance is markedly improved when a relatively tight fit exists between the exterior surface of the cup 14 and the interior surface of the semiconductive sleeve 31.

Further, it will be understood that in order to reduce electrical losses, it is advisable to provide good electrical contact between the surfaces of the conductors 34 and 36 as well as between contiguous surfaces of the electrodes 33 and 35 and the end surfaces of the heater sleeve 31. One method of securing the electrodes would be by bonding them to the sleeve by techniques perfected in ceramic tube construction. A further technique which may be employed involves an electrodeless process in which electrodes are nickel plated to the semiconductive sleeve 31. The conductive straps 34 and 36 are then simply soldered to the electrodes. In the present instance, the electrodes 33 and 35 take the form of flat bands or rings which intimately engage respective surfaces adjacent the opposite ends of the sleeve 31.

Since the initial or cold resistance is a critical factor in the operation of the thermistor, it is important to select the proper size and location of the conductors. That is, the initial resistance determines the level of the surge current which, in turn, directly effects the response of the thermal device. However, other electrode configurations as well as other locations of the electrodes are quite possible as long as the electrical current preferably traverses the entire body of the semiconductive material. In FIG. 1, the electrical current substantially flows axially through the semiconductive element 31; however, as will be disclosed hereinafter thermistors have been developed in which the current flows in a radial direction. In the present instance, if one desires radial direction current flow it is simply necessary to bond the electrodes directly to the inner and outer surfaces of the hollow sleeve 31. The leads 35 and 36 may then be soldered to the cylinder-like electrodes which may be deposited on the inner and outer surfaces of the sleeve 31. Further, it has been found that by increasing the resistive value of the semiconductive material, a lower value of surge current will result but an increased value of response time will occur due to consumption of less power.

It has been long known that extremely high temperatures cause undesired or excessive stretching of diaphragm 18 and also produce thermal degradation of the wax and rubber components thereby shortening the useful life of the device. High temperatures, in some cases, also produce excessive piston motions which can cause mechanical stresses and strains which result in damage to the thermal device or motor 10. It is therefore of paramount importance to limit the maximum heating temperature which in turn limits the expansion of the expansion material. This temperature limiting action is uniquely accomplished by the internal characteristics of the thermistor 40 which cause a dramatic rise in resistance when the temperature is increased in a particular temperature range.

Figure 4:
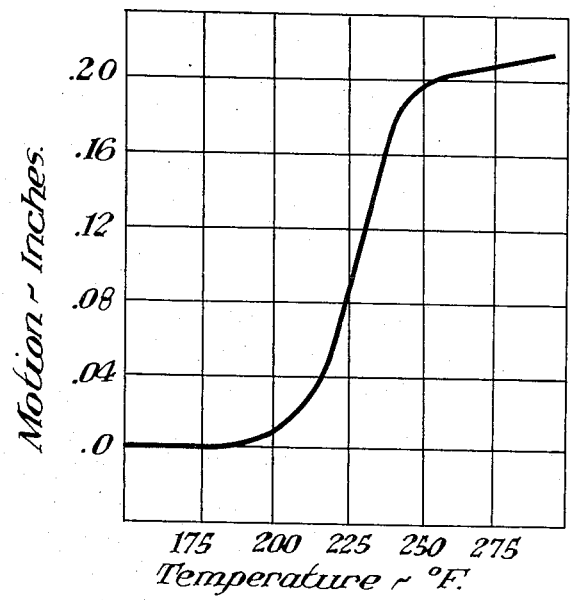
FIG. 4 is a performance curve showing the temperature-motion characteristics of the thermal device embodying the present invention.
Figure 5:
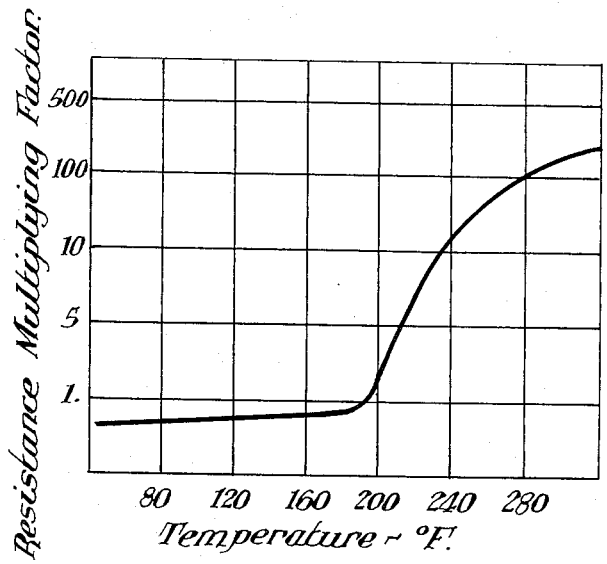
FIG. 5 is a temperature versus resistance graph of a positive temperature coefficient thermistor which is employed in the thermal device embodying the present invention.

Turning now to FIG. 5, there is shown a typical response curve of temperature versus electrical resistance for a positive temperature coefficient thermistor. As shown, the resistance remains somewhat fixed at less than 1 ohm at temperatures up to approximately 190° F. At this point a gradual increase in resistance occurs as the temperature is increased. As the temperature continues to increase a dramatic change in the resistance occurs. Thus, at 250° F. the resistance of the thermistor reaches approximately 60 times that at 200° F. If we assume that a constant voltage is supplied to the thermistor 30, its thermal output at 200° F. will be a great many times its thermal output at 280° F., since $P = E^2/R = I^2 R$. It will be appreciated during the heating cycle some of the thermal energy is lost directly to the ambient while some is also lost due to the heat sink effect of metallic members 14 and 15. Additionally, some of the heat which is conveyed to the expansion material 17 is conducted and radiated by the end wall of the cup 14. These heat losses, in combination with thermal resistances at the various interfaces, cause the temperature of the expansion material to always be somewhat lower than the temperature of the thermistor, itself. For instance, a thermistor temperature approaching 280° F. is necessary to provide sufficient thermal drive to heat wax type expansion material to a safe peak temperature of 250° F. Further, it has been found that at approximately 280° F. a thermal equilibrium occurs between the wax and thermistor so that the thermal losses offset the reduced thermal output, and thus a wax temperature of 250° F. will be maintained. Accordingly, in viewing FIG. 5, it will be noted that the temperature-resistance characteristics of the thermistor produce a current-limiting action which regulates the maximum amount of thermal energy that is applied to the expandable wax, and thus effectively controls the maximum amount of movement imparted to the piston 16. In practice, a conductive filled wax and a cylindrical type of thermistor have achieved a piston motion or movement of approximately 0.18 inch in an operating temperature range between about 200° F. and 250° F., as illustrated by the curve in FIG. 4.

However, it will be appreciated that the operating temperature range is variable and is dependent not only upon the ambient temperature but also upon the thermistor material or type, the thermal responsive material, the desired piston movement, the thermal losses, the response time and various other influencing factors.

Let us now assume that it is desirable to operate the associated valve or switch (not shown) by extending the piston 16 to its extended position. To accomplish this, it is simply necessary to close the contacts of the switch which connected conductive leads 34 and 36 to the voltage supply source. With the supply circuit closed, electrical current begins to flow through the semiconductive material of the thermistor 30, and the $I^2$ R Factor transforms the electrical energy into thermal energy. The thermal energy heats the thermistor which follows the characteristic curve of FIG. 5. When the temperature reaches approximately 200° F., a wax type material 17 begins to transform from a solid to a liquid and to expand as shown by the curve of FIG. 4. As the temperature continues to rise, the wax continues to expand, and the resistance continues to increase. The expanding wax deforms the central portion of the diaphragm 18 which urges the plug 21 through the reduced bore portion of the cylinder 15. The extension of the plug 21 causes the piston to move outwardly toward its second extended position. When the thermistor 30 reaches the upper level of the operating temperature range, namely, approximately 280° F., a point of equilibrium is reached so that no increase in temperature occurs even though the power supply remains connected to the thermistor 30. At this temperature, the wax temperature also reaches a maximum of approximately 250° F. At this temperature, maximum expansion of the wax 17 occurs, maximum deformation of the diaphragm 18 results, maximum displacement of the plug 21 occurs, and the piston 16 reaches its fully extended position. Thus, a self-regulating effect takes place due to the current-limiting characteristic of the thermistor 30, and, therefore, no further expansion of the wax 17 occurs and the piston 16 experiences no further outward movement. The piston 16 will remain extended until it is desired to return the valve or switch to its original position by causing retraction of the piston. To return the piston to its initial position again, it is simply necessary to interrupt the power supply circuit by opening the switch contacts. The cessation of current to thermistor 30 causes the entire thermal motor 10 to begin cooling. As the thermal energy begins dissipating to the ambient, the cooling wax starts to contract and the piston follows due to the biasing action of the spring (not shown). When the wax temperature reaches approximately 200° F., the piston will assume its original retracted position as shown by the curve of FIG. 4. Thus, it can be seen that by providing a thermistor for heating the fusible wax of a thermal expansion motor, a more reliable and efficient device is realized with less elements and at a lower cost.

While the thermistor 30 is shown in FIG. 1 as being situated in surrounding relationship with the peripheral surface of cup 14, it has been found that less thermal losses can be achieved by placing the thermistor inside or internal of the lower cup-like member 14. Since the thermal losses are reduced due to the thermistor being unexposed to the ambient milieu, less power is required in heating the expandable wax to its upper operating temperature level of 250° F.

In discussing FIG. 2, it will be understood that the various elements, such as, the piston, the plug 21a, the diaphragm 18a and the upper cylinder 15a, are substantially identical to those described in FIG. 1, and therefore no further description is to be made of their particular details. In viewing FIG. 2, it will be noted that the lower cup-like element 14a is provided with a cylinder recess or cavity 50 which may be stamped or otherwise formed in the bottom side of cup 14a.

As shown, the thermistor 30a comprises a hollow cylinder or sleeve 31a which again is preferably constructed of semiconductive material having suitable qualities and characteristics. In this instance, the inner and outer cylindrical surfaces of the thermistor body 31a are provided with metalized electrodes 33a and 34a. As previously mentioned, the electrodes may be formed by the semiconductive body in any suitable manner. A pair of electrical leads or conductors 36a and 35a are connected, such as, by being soldered to the respective metalized electrodes of the thermistor 30a. Like in FIG. 1, the other ends of the conductors are connected to a suitable constant voltage supply source. A layer of suitable electrically-insulative thermally-conductive material, such as, epoxy cement, is disposed between the inner surface of the cavity 50 and the outer surface of the thermistor 30a. Thus, the epoxy cement effectively bonds the thermistor 30a within cavity 50. A plug or retaining cover 52, preferably constructed of insulated or dielectric material, is inserted into the opened end of the cavity 50. The cover 52 not only improves the heating effect of the thermistor by retaining heat within the cavity but also electrically separates the leads 36a and 35a which pass therethrough. In order to improve the heat transfer characteristics, it may be desirable to employ a heat shield, such as characterized by numerial 42a, which in this case consists of a first sheet of insulative material 43a and a second sheet of aluminum foil 44a. Thus, the heat generated by the thermistor 30a is more effectively conveyed through the wall of the cup 14a to the expandable wax 17a. The operation of the thermal motor 10a is identical to that of FIG. 1 with the exception of the heating and cooling cycles of FIG. 2 which may be slightly different from those of FIG. 1. Further, it will be appreciated that electrical current traverses the body of the thermistor 30a in a radial direction in FIG. 2 so that the effective length and consequential resistance for like thermistor materials is less for FIG. 2 than FIG. 1.

FIG. 3 shows an alternate form of our invention in which the thermistor heater takes the form of a disk-shaped or wafer element 30b. The thermistor 30b includes a semiconductive body portion 31b which is sandwiched between a pair of flat circular metallic plates or electrodes 37 and 39. As shown, a first conductor 37a is connected to the upper metallic electrode 37 while a second conductor 39a is attached to the lower metallic electrode 39. The other ends of the conductors 37a and 39a may be connected to a suitably controlled power supply source (not shown). A layer 40b of adhesive material, such as, a silver base epoxy cement or the like, effectively bonds the thermistor 30b to the bottom end of the lower cup element 14b which contains the expandable wax pellet 17b. If desired, a heat shield 42b in the form of an inner layer 43b of thermal-conductive electrical-insulative material, an intermediate sheet 44b of aluminum foil and an outer layer 45b of foam rubber covers the outer surface of the thermistor. Thus, the shield 42b functions as a heat retainer for more effectively keeping the thermal energy produced by the thermistor 30b within the thermal motor proper. The thermal motor 10b functions and operates in substantially the same manner as the above described embodiments when electrical power is applied to the conductors 37a and 39a.

From the above description, it is apparent that this invention provides a more efficient and effective method of applying thermal energy to an expandable power element. Although we have herein shown and described several forms of thermal motors embodying our invention, it is understood that various changes and other modifications may be made without departing from the spirit and scope of our invention. For example, other shapes of thermistor bodies may be employed with equal success and different types and configurations of electrodes or conductors may also be used in practicing our invention. Similarly, other types of expandable power elements may be utilized with an appropriately shaped thermistor heater in practicing our invention. It will be understood that the above described operating temperature range is exemplary and that other operating temperature ranges may be employed with different types of expandable material and other types of positive temperature coefficient heating elements.

Having thus described our invention, what we claim is:

1. In a system for activating a movable means in response to a flow of electrical current, means for moving said movable means comprising in combination a container, thermally responsive material in said container, said container exposing said thermally responsive material to such movable means and said thermally responsive material being adapted to engage and move such movable means, and a positive temperature coefficient thermistor disposed in heat exchange relationship with said thermally responsive material, said thermistor being adapted to be electrically energized by said flow of current to heat said material.

2. A system as described in claim 1 wherein an insulating layer surrounds and is secured to the outside of the means for moving the movable means.

3. A system as described in claim 1 wherein said thermistor is integral and has electric leads attached thereto for energizing it.

4. A system as described in claim 1 wherein said thermistor is of relatively constant size irrespective of temperature.

5. In an electrical-to-thermal-to-mechanical translating device including movable means, the combination comprising a container having an open and, a thermal responsive mass disposed snugly in said container and having a working surface facing the open end of said container, said working surface being adapted to be engaged by such movable means to move the same, and electrical thermistor heating means having a positive temperature coefficient providing self-regulating current-limiting characteristics at higher temperatures, the heating means being in heat-exchange relationship with said thermal responsive mass for heating and expanding said thermal responsive mass so that the working surface of said thermal responsive mass is adapted to move such movable means relative to said container but no farther than a fixed limit of travel upon the application of a given voltage across said thermistor heating means.

6. A device as described in claim 5 wherein the thermistor is in the form of a flat layer secured proximate to a wall of the container opposite said open end.

7. A device as described in claim 5 wherein the thermistor is external of the container and including a layer of insulation material secured against a surface of the thermistor which would otherwise be open to the atmosphere to reduce the exposure of the thermistor surfaces to the ambient.

8. A device for imparting axial movement to a piston means or the like comprising in combination a container having an opening in a wall thereof and containing a thermally responsive material which is adapted to engage such piston means through the said opening, and a positive temperature coefficient thermistor spaced from and disposed in heat-exchange relationship with the material, electrodes connected to said thermistor, and electrical leads electrically connected to said electrodes and adapted to be connected to a source of electrical energy.

9. A device as described in claim 8 wherein a recess is formed in the external surface of the container and the thermistor is disposed in the recess.

10. A device as claimed in claim 8 and in which said thermistor has relatively stable dimensions under varying heat conditions.

11. A device as claimed in claim 8 and in which said thermistor has a relatively constant axial length.

* * * * *